United States Patent
Wu et al.

(10) Patent No.: US 9,331,758 B2
(45) Date of Patent: May 3, 2016

(54) METHOD AND APPARATUS FOR SUB-SAMPLING OF A CODEBOOK IN LTE-A SYSTEM

(75) Inventors: Lu Wu, PuDong Jinqiao Shanghai (CN); Hongwei Yang, PuDong Jinqiao Shanghai (CN); Hao Liu, PuDong Jinqiao Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/877,637

(22) PCT Filed: Oct. 6, 2011

(86) PCT No.: PCT/IB2011/002828
§ 371 (c)(1),
(2), (4) Date: Apr. 3, 2013

(87) PCT Pub. No.: WO2012/046144
PCT Pub. Date: Apr. 12, 2012

(65) Prior Publication Data
US 2013/0188745 A1    Jul. 25, 2013

(30) Foreign Application Priority Data
Oct. 7, 2010    (CN) .......................... 2010 1 0503793

(51) Int. Cl.
*H04B 7/02* (2006.01)
*H04B 7/04* (2006.01)
*H04L 25/03* (2006.01)

(52) U.S. Cl.
CPC ............ *H04B 7/0456* (2013.01); *H04B 7/0478* (2013.01); *H04L 25/03343* (2013.01); *H04L 25/03917* (2013.01); *H04L 25/03923* (2013.01); *H04B 7/0469* (2013.01)

(58) Field of Classification Search
CPC ................. H04L 25/03343; H04L 25/03917; H04L 25/03923; H04B 7/0478; H04B 7/0456; H04B 7/0469
USPC .......................................................... 375/267
See application file for complete search history.

(56) References Cited

U.S. PATENT DOCUMENTS

2004/0117176 A1* 6/2004 Kandhadai et al. ........... 704/223
2012/0069917 A1* 3/2012 Liu et al. ....................... 375/259

(Continued)

OTHER PUBLICATIONS

Availability R1-105165 Oct. 5, 2010; R1-105190 Oct. 6, 2010; and R1-105491 Oct. 5, 2010, printed on May 22, 2014, see also International Search Report for PCT/IB2011/002828 dated Feb. 6, 2012.*

(Continued)

*Primary Examiner* — Juan A Torres
(74) *Attorney, Agent, or Firm* — Fay Sharpe LLP

(57) ABSTRACT

The embodiments of the present invention disclose a method and an apparatus for sub-sampling of a codebook in the LTE-A system where a precoding matrix W is a product of two matrices $W_1$ and $W_2$, i.e. $W=W_1W_2$, codebooks for W, $W_1$ and $W_2$ are denoted as C, $C_1$ and $C_2$ respectively, and r indicates a rank. The method includes sub-sampling the codebook C such that the sub-sampled codebook C has a size of equal to or less than 4 bits. In the sub-sampling, codewords evenly distributed in the codebook C are extracted, where some or all of the codewords are in a form of discrete Fourier transform (DFT) vector to be suitable for evenly linear arrays, and the other codewords are suitable for cross-polarized linear arrays.

6 Claims, 1 Drawing Sheet

(56) References Cited

U.S. PATENT DOCUMENTS

2012/0076024 A1* 3/2012 Ko et al. .................. 370/252
2012/0087425 A1* 4/2012 Gomadam et al. ............ 375/260
2012/0218948 A1* 8/2012 Onggosanusi et al. ....... 370/329

OTHER PUBLICATIONS

Availability R1-104901 Aug. 17, 2010, printed on May 23, 2014.*
Panasonic, "8Tx Codebook Subsampling", 3GPP Draft; R1-104901, 3GPP, vol. RAN WG1, Aug. 17, 2010.*
R1-105011, "Way Forward on 8Tx Codebook for ReLIO DL MIMO," Alcatel -Lucent, Alcatel-Lucent Shanghai Bell, AT&T, Catt . . . ST-Ericsson RAN1 #62, Aug. 2010, Madrid, Spain.*
R1-105067, Way Forward on CSI Feedback for ReLIO DL MIMO Texas Instruments, Alcatel-Lucent, Alcatel-Lucent Shanghai Bell, AT&T, CEWiT, Ericsson ..RAN1 #62, Aug. 2010, Madrid, Spain.*
R1-104164 Way Forward on 8Tx Codebook for Re1.10 DL MIMO, CATT, Ericsson, LG Electronics, Mitsubishi Electric, Nokia, Nokia Siemens Networks, NTT DoCoMo, Panasonic, Sharp, ST-Ericsson, Texas Instruments, RAN1 #61bis, Jun. 2010, Dresden, Germany.*
R1-104259 Way Forward on CSI Feedback for Re1.10 DL MIMO Alcatel-Lucent, Alcatel-Lucent Shanghai Bell, CATT, Ericsson, Huawei, Marvell, Mitsubishi Electric, NEC, Nokia, Nokia Siemens Networks, NTT DoCoMo, Panasonic, Samsung, Sharp, ST-Ericsson, Texas Instruments, ZTE, RAN1 #61bis, Jun. 2010, Dresden, Germany.*
Catt, "Subsampling of 8Tx codebooks," $3^{rd}$ Generation Partnership Project (3GPP), 3GPP TSG RAN WG1 Meeting #62Bis, R1-105165, XP050450383, 5 pages, Xi'an, China, Oct. 11-15, 2010.
Panasonic, "8Tx Codebook Subsampling," $3^{rd}$ Generation Partnership Project (3GPP), 3GPP TSG RAN WG1 Meeting #62Bis, R1-105491, XP050450611, pp. 1-3, Xi'an, China, Nov. 11-15, 2010.
Marvell, "Codebook subsampling for PUCCH feedback," $3^{rd}$ Generation Partnership Project (3GPP), 3GPP TSG-RAN WG1 #62BIS, R1-105190, XP050450730, pp. 1-6, Xian, Oct. 11-15, 2010.
Nokia et al., "Double codebook design principles," $3^{rd}$ Generation Partnership Project (3GPP), 3GPP TSG RAN WG1 Meeting #62bis, R1-1-3804, XP050449423, 9 pages, Dresden, Germany, Jun. 28-Jul. 2, 2010.
International Search Report for PCT/IB2011/002828 dated Feb. 6, 2012.
Alcatel-Lucent, et al., "Way Forward on 8Tx Codebook for Re1.10 DL MIMO", 3GPP TSG RAN WG1 62, R1-105011, Madrid, Spain, Aug. 23-27, 2010.
Japanese Office Action dated May 29, 2014 (including English translation).
Nokia et al., "Double codebook design principles," R1-103804, 3GPP TSG RAN WG1 Meeting #61bis, Dresden, Germany, Jun. 28-Jul. 2, 2010.
Ericsson, et al., "Refinements of Feedback and Codebook Design", R1-103333, 3GPP TSG-RAN WG1 #61, Montreal, Canada, May 10-14, 2010.

* cited by examiner

METHOD AND APPARATUS FOR SUB-SAMPLING OF A CODEBOOK IN LTE-A SYSTEM

TECHNICAL FIELD

The present invention relates to Long Term Evolution Advanced (LTE-A), especially to a method and apparatus for sub-sampling of a codebook in LTE-A system.

BACKGROUND OF THE INVENTION

Nowadays, LTE technology is one of leading technologies in the field of radio technology. Various precoding technologies are widely used in the LTE system. In accordance with the 8 transmitting antenna codebook prescribed in R1-105011 of LTE-A Rel-10 (8Tx codebook for short), a precoder for subbands is a product of two matrices $W_1$ and $W_2$, in which matrix $W_1$ corresponds to wideband and/or long-term channel properties, and the other matrix $W_2$ corresponds to frequency-selective and/or short-term channel properties. For rank 1 and rank 2, the codebook sizes for $W_1$ and $W_2$ are both 4 bits. Thus, in Channel State Information (CSI) reporting mode 1-1 (broadband mode), 8 bits are needed to represent Precoding Matrix Indicator (PMI), however, it is prescribed that only 4 bits could be used for PMI feedback. Thus, the currently prescribed 8Tx codebook cannot be directly used in this CSI reporting mode 1-1, and thus sub-sampling of the currently prescribed 8Tx codebook is necessary and important.

In R1-105011, "Way Forward on 8Tx Codebook for Rel.10 DL MIMO", RAN1#62, Madrid, Spain, August 2010, it is prescribed only the 8Tx codebook, while no solution is presented for sub-sampling of the 8Tx codebook.

SUMMARY OF THE INVENTION

In view of the problems existing in the prior art, the embodiments of the present invention provide a method and an apparatus for sub-sampling of a codebook in the LTE-A system.

According to an embodiment of the invention, it is provided a method for sub-sampling of a codebook in a LTE-A system where a precoding matrix W is a product of two matrices $W_1$ and $W_2$, i.e. $W=W_1 W_2$, codebooks for W, $W_1$ and $W_2$ are denoted as C, $C_1$ and $C_2$ respectively, and r indicates a rank. The method comprises:

sub-sampling the codebook C such that the sub-sampled codebook C has a size of equal to or less than 4 bits.

According to another embodiment of the invention, it is provided an apparatus for sub-sampling of a codebook in a LTE-A system where a precoding matrix W is a product of two matrices $W_1$ and $W_2$, i.e. $W=W_1 W_2$, codebooks for W, $W_1$ and $W_2$ are denoted as C, $C_1$ and $C_2$ respectively, and r indicates a rank. The apparatus comprises:

sub-sampling means for sub-sampling the codebook C such that the sub-sampled codebook C has a size of equal to or less than 4 bits.

BRIEF DESCRIPTION OF THE INVENTION

The other features, objects and advantages of this invention are made more evident, when the following detailed description to the non-limiting embodiments is read in conjunction with the accompanying drawings.

DETAILED DESCRIPTION

Figure 1:
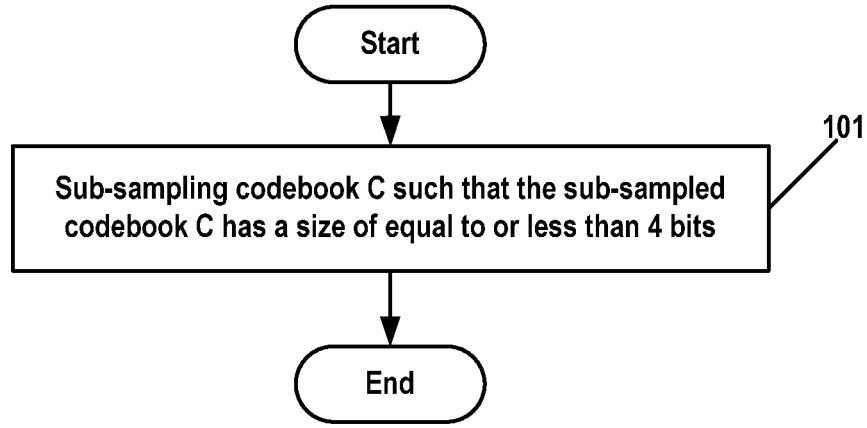
FIG. 1 illustrates a method for sub-sampling of a codebook in a LTE-A system according to an embodiment of the invention.

A method and an apparatus for sub-sampling of a codebook in the LTE-A system is described in conjunction with drawings and with reference to the embodiments.

Prior to introducing embodiments of the invention, let's have a review to the 8Tx codebook C presented in R1-105011 of LTE-A Rel-10, in which the precoding matrix W is defined as a product of $W_1$ and $W_2$, i.e., $W=W_1 W_2$. Codebooks for W, $W_1$ and $W_2$ are denoted as C, $C_1$ and $C_2$ respectively. In other words, the 8Tx codebook C is comprised of two constituent codebooks (namely, codebooks $C_1$ and $C_2$).

A first Codebook1 $C_1$ of rank 1 codebook and rank 2 codebook may be expressed as:

$$B = [\, b_0 \; b_1 \; \ldots \; b_{31}\,], [B]_{1+m,1+n} = e^{j\frac{2\pi mn}{32}}, m = 0, 1, 2, 3,$$
$$n = 0, 1, \ldots, 31$$

$$X^{(k)} \in$$
$$\{[\, b_{2k\bmod 32} \; b_{(2k+1)\bmod 32} \; b_{(2k+2)\bmod 32} \; b_{(2k+3)\bmod 32}\,] : k = 0, 1, \ldots, 15\}$$

$$W_1^{(k)} = \begin{bmatrix} X^{(k)} & 0 \\ 0 & X^{(k)} \end{bmatrix}$$

Codebook 1: $C_1 = \{W_1^{(0)}, W_1^{(1)}, W_1^{(2)}, \ldots, W_1^{(15)}\}$

A second Codebook2 $C_2$ of rank 1 codebook may be expressed as:

$$W_2^{(4k+l)} = \frac{1}{\sqrt{2}} \begin{bmatrix} e_{k+1} \\ \alpha_l e_{k+1} \end{bmatrix}, k = 0, 1, 2, 3; l = 0, 1, 2, 3$$

Codebook 2: $C_2 = \{W_2^{(0)}, W_2^{(1)}, W_2^{(2)}, \ldots, W_2^{(15)}\}$,
where $\alpha_0 = 1, \alpha_1 = j, \alpha_2 = -1, \alpha_3 = -j$, $e_k$ is an 4×1 selection vector for which the k-th element has a value of 1 and other elements are all zero.

A second codebook Codebook2 $C_2$ of rank 2 codebook may be expressed as:

$$W_2^{(2k+l)} = \frac{1}{\sqrt{2}} \begin{bmatrix} Y_1^k & Y_2^k \\ \alpha_l Y_1^k & -\alpha_l Y_2^k \end{bmatrix}, k = 0, 1, \ldots, 7; l = 0, 1$$

Codebook 2: $C_2 = \{W_2^{(0)}, W_2^{(1)}, W_2^{(2)}, \ldots, W_2^{(15)}\}$,
where $\alpha_0 = 1, \alpha_1 = j$, $e_k$ is an 4×1 selection vector for which the k-th element has a value of 1 and other elements are all zero, and $(Y_1^0, Y_2^0) = (e_1, e_1)$, $(Y_1^1, Y_2^1) = (e_2, e_2)$, $(Y_1^2, Y_2^2) = (e_3, e_3)$, $(Y_1^3, Y_2^3) = (e_4, e_4)$, $(Y_1^4, Y_2^4) = (e_1, e_2)$, $(Y_1^5, Y_2^5) = (e_2, e_3)$, $(Y_1^6, Y_2^6) = (e_1, e_4)$, $(Y_1^7, Y_2^7) = (e_2, e_4)$.

A first codebook Codebook1 $C_1$ of rank 3 codebook and rank 4 codebook presented in R1-105011 may be expressed as:

$$B = [b_0 \quad b_1 \quad \ldots \quad b_{15}], [B]_{1+m,1+n} = e^{j\frac{2\pi mn}{16}}, m = 0, 1, 2, 3,$$

$$n = 0, 1, \ldots 15$$

$$X^{(k)} \in \{[b_{4k \bmod 32} \quad b_{(4k+1) \bmod 32} \quad \ldots \quad b_{(4k+7) \bmod 16}]: k = 0, 1, 2, 3\}$$

$$W_1^{(k)} = \begin{bmatrix} X^{(k)} & 0 \\ 0 & X^{(k)} \end{bmatrix}$$

Codebook 1: $C_1 = \{W_1^{(0)}, W_1^{(1)}, W_1^{(2)}, W_1^{(3)}\}$.

A second codebook Codebook2 $C_2$ of rank 3 codebook may be expressed as:

$$W_2 \in C_2 = \left\{ \frac{1}{\sqrt{2}} \begin{bmatrix} Y_1 & Y_2 \\ Y_1 & -Y_2 \end{bmatrix} \right\}$$

$(Y_1, Y_2) \in$ $$\left\{ \begin{array}{l} (e_1, [e_1 \quad e_5]), (e_2, [e_2 \quad e_6]), (e_3, [e_3 \quad e_7]), (e_4, [e_4 \quad e_8]), \\ (e_5, [e_1 \quad e_5]), (e_6, [e_2 \quad e_6]), (e_7, [e_3 \quad e_7]), (e_8, [e_4 \quad e_8]), \\ ([e_1 \quad e_5], e_5), ([e_2 \quad e_6], e_6), ([e_3 \quad e_7], e_7), ([e_4 \quad e_8], e_8), \\ ([e_5 \quad e_1], e_1), ([e_6 \quad e_2], e_2), ([e_7 \quad e_3], e_3), ([e_8 \quad e_4], e_4) \end{array} \right\};$$

A second codebook Codebook2 $C_2$ of rank 4 codebook may be expressed as:

$$W_2 \in C_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\}$$

$Y \in \{[e_1 \quad e_5], [e_2 \quad e_6], [e_3 \quad e_7], [e_4 \quad e_8]\}$.

In the context of the application, $e_k$ indicates a 4×1 selection vector for which the k-th element has a value of 1 and other elements are all zero, unless otherwise indicated.

As to rank 5-8 codebooks presented in R1-105011, no sub-sampling is required in CSI reporting mode 1-1. Therefore, detailed description for it is omitted here. As to rank 5-8 codebooks, please refer to R1-105011 for more information.

Payload sizes for rank 1-8 codebooks are summarizes as follows.

If the rank is 1 or 2, $C_1$ has a size of 4 bits, and $C_2$ has a size of 4 bits;

If the rank is 3, $C_1$ has a size of 2 bits, and $C_2$ has a size of 4 bits;

If the rank is 4, $C_1$ has a size of 2 bits, and $C_2$ has a size of 3 bits;

If the rank is 5-7, $C_1$ has a size of 2 bits, and $C_2$ has a size of 0 bit;

If the rank is 8, $C_1$ has a size of 0 bit, and $C_2$ has a size of 0 bit.

With regard to CSI reporting mode 1-1, only 4 bits may be used for feeding back $W_1$ and $W_2$. Thus, in CSI reporting mode 1-1, rank 1-4 codebooks should be sub-sampled to 4 bits at most.

FIG. 1 illustrates a method for sub-sampling of a codebook in the LTE-A system according to an embodiment of the invention. In the system, a precoding matrix W is a product of two matrices $W_1$ and $W_2$, i.e. $W=W_1W_2$, codebooks for W, $W_1$ and $W_2$ are denoted as C, $C_1$ and $C_2$ respectively, and r indicates a rank. As shown in FIG. 1, in method 100 at step 101, a codebook C is sub-sampled such that the sub-sampled codebook C has a size of equal to or less than 4 bits. Codebook C is a 8Tx codebook prescribed in R1-105011, for example.

When the rank is 1 or 2, the codebook C has a size of 8 bits, i.e., it contains 256 codewords. After the sub-sampling, 16 codewords evenly distributed in the codebook C are extracted from the 256 codewords such that the sub-sampled codebook C may represent PMI with 4 bits.

According to an embodiment of the invention, when r=3 or 4, $C_1$ still has the size of 2 bits, but $C_2$ is sub-sampled as:

$$C_2 = \left\{ \frac{1}{\sqrt{2}} \begin{bmatrix} Y_1 & Y_2 \\ Y_1 & -Y_2 \end{bmatrix} \right\} \text{ for } r = 3 \quad (1)$$

$(Y_1, Y_2) \in \{(e_1, [e_1, e_5]), (e_2, [e_2, e_6]),$
$(e_3, [e_3, e_7]), (e_4[e_4, e_8])\};$ $$C_2 = \left\{ \frac{1}{\sqrt{2}} \begin{bmatrix} Y & Y \\ Y & -Y \end{bmatrix} \right\} \text{ for } r = 4 \quad (2)$$

$$Y \in \left\{ \begin{array}{l} [e_1, e_5], [e_2, e_6], \\ [e_3, e_7], [e_4, e_8] \end{array} \right\};$$

where $e_k$ indicates a 4×1 selection vector for which the k-th element has a value of 1 and other elements are all zero. It can be seen that the above sub-sampled rank 3 codebook and rank 4 codebook both have a nesting property.

According to another embodiment of the invention, when r=1 or 2, $C_1$ still has the size of 4 bits, but $C_2$ is defined as: the sub-sampled $C_2$ is $$C_2 = \left\{ \begin{bmatrix} e_1 \\ e_1 \end{bmatrix} \right\} \text{ for } r = 1,$$

the sub-sampled $C_2$ is $$C_2 = \left\{ \begin{bmatrix} e_1 & e_1 \\ e_1 & -e_1 \end{bmatrix} \right\} \text{ for } r = 2,$$

where the sub-sampled rank 1 codebook, rank 2 codebook as well as the above sub-sampled rank 3 codebook and rank 4 codebook all have a nesting property.

According to a further embodiment of the invention, when r=1 or 2, $C_1$ still has the size of 4 bits. For each codeword in $C_1$, only one codeword in $C_2$ is corresponding thereto. According to a preferred embodiment of the invention, when r=1, for the codeword $W_1^{(4k+l)}$, (k=0, 1, 2, 3, l=0, 1, 2, 3) in $C_1$, the codeword $$\frac{1}{\sqrt{2}} \begin{bmatrix} e_1 \\ \alpha_l e_1 \end{bmatrix}$$

in $C_2$ is extracted to correspond thereto, where $\alpha_0=1$, $\alpha_1=j$, $\alpha_2=-1$ and $\alpha_3=-j$. When r=2, for the codeword $W_1^{(2k+l)}$ (k=0, 1, . . . , 7, l=0, 1) in $C_1$, the codeword $$\frac{1}{\sqrt{2}} \begin{bmatrix} e_1 & e_1 \\ \alpha_l e_1 & -\alpha_l e_1 \end{bmatrix}$$

in $C_2$ is extracted to correspond thereto, where $\alpha_0=1$, $\alpha_1=j$.

According to another embodiment of the invention, when r=1 or 2, $C_1$ and $C_2$ are sub-sampled respectively. In particular, $C_1$ is sub-sampled to 3 bits, and $C_2$ is sub-sampled to 1 bit.

According to a preferred embodiment of the invention, the sub-sampled $C_1$ is $C_1=\{W_1^{(0)}, W_1^{(2)}, W_1^{(4)}, \ldots, W_1^{(14)}\}$, the sub-sampled $C_2$ is $$C_2 = \left\{ \begin{bmatrix} e_1 \\ e_1 \end{bmatrix}, \begin{bmatrix} e_1 \\ je_1 \end{bmatrix} \right\} \text{ for } r = 1;$$

and the sub-sampled $C_2$ is $$C_2 = \left\{ \begin{bmatrix} e_1 & e_1 \\ e_1 & -e_1 \end{bmatrix}, \begin{bmatrix} e_1 & e_1 \\ je_1 & -je_1 \end{bmatrix} \right\} \text{ for } r = 2.$$

According to another embodiment of the invention, in the sub-sampling, codewords evenly distributed in the codebook C are extracted, where some or all of the codewords are in a form of discrete Fourier transform (DFT) vector to be suitable for evenly linear arrays, and the other codewords are suitable for cross-polarized linear arrays.

Figure 2:
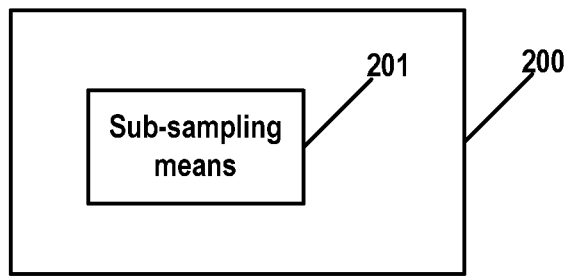
FIG. 2 illustrates an apparatus for sub-sampling of a codebook in a LTE-A system according to an embodiment of the invention.

FIG. 2 illustrates an apparatus 200 for sub-sampling of a codebook in the LTE-A system according to an embodiment of the invention. In the system, a precoding matrix W is a product of two matrices $W_1$ and $W_2$, i.e. $W=W_1W_2$, codebooks for W, $W_1$ and $W_2$ are denoted as C, $C_1$ and $C_2$ respectively, and r indicates a rank. As shown in FIG. 2, the apparatus 200 includes a sub-sampling means 201 adapted to sub-sample a codebook C such that the sub-sampled codebook C has a size of equal to or less than 4 bits.

According to an embodiment of the invention, when r=3 or 4, $C_1$ still has the size of 2 bits, and $C_2$ is sub-sampled as:

$$C_2 = \left\{ \frac{1}{\sqrt{2}} \begin{bmatrix} Y_1 & Y_2 \\ Y_1 & -Y_2 \end{bmatrix} \right\} \text{ for } r = 3 \quad (3)$$

$(Y_1, Y_2) \in \{(e_1, [e_1, e_5]), (e_2[e_2, e_6]),$ $(e_3, [e_3, e_7]), (e_4, [e_4, e_8])\};$ $$C_2 = \left\{ \frac{1}{\sqrt{2}} \begin{bmatrix} Y & Y \\ Y & -Y \end{bmatrix} \right\} \text{ for } r = 4$$

$Y \in \{[e_1, e_5], [e_2, e_6], [e_3, e_7], [e_4, e_8]\};$ where $e_k$ indicates a 4×1 selection vector for which the k-th element has a value of 1 and other elements are all zero. It can be seen that the above sub-sampled rank 3 codebook and rank 4 codebooks both have a nesting property.

According to an embodiment of the invention, when r=1 or 2, $C_1$ still has the size of 4 bits, but $C_2$ is defined as:
the sub-sampled $C_2$ is $$C_2 = \left\{ \begin{bmatrix} e_1 \\ e_1 \end{bmatrix} \right\} \text{ for } r = 1,$$

the sub-sampled $C_2$ is $$C_2 = \left\{ \begin{bmatrix} e_1 & e_1 \\ e_1 & -e_1 \end{bmatrix} \right\} \text{ for } r = 2,$$

where the sub-sampled rank 1 codebook, rank 2 codebook as well as the above sub-sampled rank 3 codebook and rank 4 codebook have a nesting property.

According to an embodiment of the invention, when r=1 or 2, $C_1$ still has the size of 4 bits. For each codeword in $C_1$, only one codeword in $C_2$ is corresponding thereto. According to a preferred embodiment of the invention, when r=1, for the codeword $W_1^{(4k+l)}$ (k=0, 1, 2, 3, l=0, 1, 2, 3) in $C_1$, the codeword $$\frac{1}{\sqrt{2}} \begin{bmatrix} e_1 \\ \alpha_l e_1 \end{bmatrix}$$

in $C_2$ is extracted to correspond thereto, where $\alpha_0=1$, $\alpha_1=j$, $\alpha_2=-1$ and $\alpha_3=-j$. When r=2, for the codeword $w_1^{(2k+l)}$ (k=0, 1, ..., 7, l=0, 1) in $C_1$, the codeword $$\frac{1}{\sqrt{2}} \begin{bmatrix} e_1 & e_1 \\ \alpha_l e_1 & -\alpha_l e_1 \end{bmatrix}$$

in $C_2$ is extracted to correspond thereto, where $\alpha_0=1$, $\alpha_1=j$.

According to an embodiment of the invention, when r=1 or 2, $C_1$ and $C_2$ are sub-sampled respectively. In particular, $C_1$ is sub-sampled to 3 bits, and $C_2$ is sub-sampled to 1 bit. According to a preferred embodiment of the invention, the sub-sampled $C_1$ is $C_1=\{W_1^{(0)}, W_1^{(2)}, W_1^{(4)}, \ldots, W_1^{(14)}\}$; the sub-sampled $C_2$ is $$C_2 = \left\{ \begin{bmatrix} e_1 & e_1 \\ e_1 & -e_1 \end{bmatrix}, \begin{bmatrix} e_1 & e_1 \\ je_1 & -je_1 \end{bmatrix} \right\} \text{ for } r = 2.$$

and the sub-sampled $C_2$ is $$C_2 = \left\{ \begin{bmatrix} e_1 & e_1 \\ e_1 & -e_1 \end{bmatrix}, \begin{bmatrix} e_1 & e_1 \\ je_1 & -je_1 \end{bmatrix} \right\} \text{ for } r = 2.$$

According to another embodiment of the invention, in the sub-sampling, codewords evenly distributed in the codebook C are extracted, where some or all of the codewords are in a form of discrete Fourier transform (DFT) vector to be suitable for evenly linear arrays, and the other codewords are suitable for cross-polarized linear arrays.

Next, the method for sub-sampling of the codebook in the LTE-A system according to embodiments of the invention is further described in connection with the detailed embodiments of the invention.

Sub-Sampling Scheme for CSI Mode 1-1 According to Embodiments of the Invention

In the following, the sub-sampling schemes of rank 1-4 for CSI mode 1-1 are presented according to embodiments of the invention.

1. Sub-Sampling of Rank 3 or 4 Codebook

In order to achieve the nesting property of rank 3-7 codebooks, sub-sampling of rank 3 or 4 codebooks are proposed as follows. Note that since the rank 8 codebook corresponds to only one codeword, the nesting property thereof is unnecessary to be considered.

rank 3 or 4: the first codebook $C_1$ is the same as the above-mentioned original 2 bits codebook, while the second codebook $C_2$ is sub-sampled as:

when rank=3, $$\text{Codebook 2: } C_2 = \left\{ \frac{1}{\sqrt{2}} \begin{bmatrix} Y_1 & Y_2 \\ Y_1 & -Y_2 \end{bmatrix} \right\} \quad (5)$$

$(Y_1, Y_2) \in \{(e_1, [e_1, e_5]), (e_2, [e_2, e_6]),$
$(e_3, [e_3, e_7]), (e_4, [e_4, e_8])\};$ when rank=4, $$\text{Codebook 2: } C_2 = \left\{ \frac{1}{\sqrt{2}} \begin{bmatrix} Y & Y \\ Y & -Y \end{bmatrix} \right\} \quad (6)$$

$Y \in \{[e_1, e_5], [e_2, e_6], [e_3, e_7], [e_4, e_8]\}.$

The sub-sampled rank 3 and rank 4 codebooks obtained in this sub-sampling manner may have a nesting property together with the corresponding sub-sampled rank 1 and rank 2 codebooks having nesting property as well as rank 5-7 codebooks. This nesting property is very important for precoding, since base stations may acquire codeword information for various ranks according to the feedback PMI.

2. Sub-Sampling of Rank 1 or 2 Codebooks

As to sub-sampling of rank 1 or 2 codebooks, there may by a number of solutions to extract 16 codewords evenly distributed in the 256 codewords of codebook C. However, the sampling according to embodiments of the invention should obey the following principles:

(1) Due to the 4-bit limit in CSI mode 1-1, with sub-sampling there are at most 16 4TxDFT beams for X in W1 design.

(2) Accordingly, the sub-sampling scheme may select from $C_1$ 16 or 8 or 4 4TxDFT beams for X.

(3) Furthermore, W1*W2 may generate at least 4 8TxDFT vectors, which is suitable for evenly linear arrays.

Next, some examples for sub-sampling rank 1 or 2 codebooks are provided. For rank r, codeword $(m,n)_r$ represents a codeword with rank r constructed by the multiplication of codeword with index m in $C_1$ and codeword with index n in $C_2$.

Sub-Sampling Scheme 1 for Rank 1 or 2 Codebooks

A 16-point 4-TxDFT for X is selected during design of $W_1$, and four 8-TxDFT vectors are generated from $W_1$ and $W_2$. These 8-TxDFT vectors are particularly suitable for evenly linear arrays, and the other 12 codewords in the sub-sampled codebook are suitable for cross-polarized arrays. With this sub-sampling and the sub-sampling for rank 3 or 4 as shown in equations (5) and (6), the sub-sampled codebooks with ranks 1 to 7 have the nesting property.

In this scheme, the first Codebook1 $C_1$ is the same as original 4 bits codebook, while the second Codebook2 $C_2$ is defined as:

$$\text{Rank 1: Codebook 2: } C_2 = \left\{ \begin{bmatrix} e_1 \\ e_1 \end{bmatrix} \right\},$$

$$\text{Rank 2: Codebook 2: } C_2 = \left\{ \begin{bmatrix} e_1 & e_1 \\ e_1 & -e_1 \end{bmatrix} \right\}.$$

Thereby, the sub-sampled codewords may be indexed as follows.

Rank 1: $(0,0)_1$, $(1,0)_1$, $(2,0)_1$, $(3,0)_1$, $(4,0)_1$, $(5,0)_1$, $(6,0)_1$, $(7,0)_1$, $(8,0)_1$, $(9,0)_1$, $(10,0)_1$, $(11,0)_1$, $(12,0)_1$, $(13,0)_1$, $(14,0)_1$, $(15,0)_1$ Rank 2: $(0,0)_2$, $(1,0)_2$, $(2,0)_2$, $(3,0)_2$, $(4,0)_2$, $(5,0)_2$, $(6,0)_2$, $(7,0)_2$, $(8,0)_2$, $(9,0)_2$, $(10,0)_2$, $(11,0)_2$, $(12,0)_2$, $(13,0)_2$, $(14,0)_2$, $(15,0)_2$.

Sub-Sampling Scheme 2 for Rank 1 or 2 Codebooks

A 16-point 4-TxDFT for X is selected during design of $W_1$, and sixteen 8-TxDFT vectors are generated from $W_1$ and $W_2$. The sub-sampled codewords may be indexed as follows.

Rank 1: $(0,0)_1$, $(1,1)_1$, $(2,2)_1$, $(3,3)_1$, $(4,0)_1$, $(5,1)_1$, $(6,2)_1$, $(7,3)_1$, $(8,0)_1$, $(9,1)_1$, $(10,2)_1$, $(11,3)_1$, $(12,0)_1$, $(13,1)_1$, $(14,2)_1$, $(15,3)_1$ Rank 2: $(0,0)_2$, $(1,1)_2$, $(2,0)_2$, $(3,1)_2$, $(4,0)_2$, $(5,1)_2$, $(6,0)_2$, $(7,1)_2$, $(8,0)_2$, $(9,1)_2$, $(10,0)_2$, $(11,1)_2$, $(12,0)_2$, $(13,1)_2$, $(14,0)_2$, $(15,1)_2$.

Sub-Sampling Scheme 3 for Rank 1 or 2 Codebooks

A 8-point 4-TxDFT for X is selected during design of $W_1$, and four 8-TxDFT vectors are generated from $W_1$ and $W_2$.

The first codebook Codebook 1: $C_1 = \{W_1^{(0)}, W_1^{(2)}, W_1^{(4)}, \ldots, W_1^{(14)}\}$;

$$\text{Rank 1: Codebook 2: } C_2 = \left\{ \begin{bmatrix} e_1 \\ e_1 \end{bmatrix}, \begin{bmatrix} e_1 \\ je_1 \end{bmatrix} \right\}$$

$$\text{Rank 2: Codebook 2: } C_2 = \left\{ \begin{bmatrix} e_1 & e_1 \\ e_1 & -e_1 \end{bmatrix}, \begin{bmatrix} e_1 & e_1 \\ je_1 & -je_1 \end{bmatrix} \right\}$$

Thereby the sub-sampled codewords may be indexed as follows.

Rank 1: $(0,0)_1$, $(0,1)_1$, $(2,0)_1$, $(2,1)_1$, $(4,0)_1$, $(4,1)_1$, $(6,0)_1$, $(6,1)_1$, $(8,0)_1$, $(8,1)_1$, $(10,0)_1$, $(10,1)_1$, $(12,0)_1$, $(12,1)_1$, $(14,0)_1$, $(14,1)_1$ Rank 2: $(0,0)_2$, $(0,1)_2$, $(2,0)_2$, $(2,1)_2$, $(4,0)_2$, $(4,1)_2$, $(6,0)_2$, $(6,1)_2$ $(8,0)_2$, $(8,1)_2$, $(10,0)_2$, $(10,1)_2$, $(12,0)_2$, $(12,1)_2$, $(14,0)_2$, $(14,1)_2$.

From the above description, it is apparent that the method and apparatus for sub-sampling a codebook in the LTE-A system according to embodiments of the invention is easily to be obtained from the original codebooks prescribed in the protocol, and may have good nesting property as well as high spatial resolution. Further, the method and apparatus for sub-sampling a codebook in the LTE-A system according to embodiments of the invention is suitable for precoding data by LTE advanced base station and user equipment (UE).

The foregoing is described with respect to embodiments of the invention, however, the present invention is not limited to any specific methods or apparatuses. Various change or modification can be made by the skilled in the art without departing from the scope of the appended claims.

What is claimed is:

1. A method for sub-sampling of a codebook in a LTE-A system, the method comprising:
receiving at a base station a precoding matrix W as a product of two matrices $W_1$ and $W_2$, wherein $W=W_1 W_2$, and codebooks for W, $W_1$ and $W_2$ are denoted as C, $C_1$ and $C_2$ respectively, and r indicates a rank;
the base station sub-sampling the codebook C by applying the following equations under the following circumstances such that the sub-sampled codebook C has a size of equal to or less than 4 bits, wherein when the received codebook has an r=1 or 2, $C_1$ has the size of 4 bits and for a given codeword in $C_1$, one codeword in $C_2$ corresponds;

wherein when the received codebook has a value of r=3 or 4, $C_1$ has a size of 2 bits and $C_2$ is subsampled as:

$$C_2 = \left\{ \frac{1}{\sqrt{2}} \begin{bmatrix} Y_1 & Y_2 \\ Y_1 & -Y_2 \end{bmatrix} \right\} \text{ for } r = 3 \quad (1)$$

$(Y_1, Y_2) \in \{(e_1, [e_1, e_5]), (e_2, [e_2, e_6]),$
$(e_3, [e_3, e_7]), (e_4, [e_4, e_8])\};$ $$C_2 = \left\{ \frac{1}{\sqrt{2}} \begin{bmatrix} Y & Y \\ Y & -Y \end{bmatrix} \right\} \text{ for } r = 4 \quad (2)$$

$Y \in \{[e_1, e_5], [e_2, e_6], [e_3, e_7], [e_4, e_8]\};$ $Y \in \{[e_1,e_5],[e_2,e_6],[e_3,e_7],[e_4,e_8]\}$ where $e_k$ indicates an 8×1 selection vector for which the k-th element has a value of 1 and the other elements are zero, and the sub-sampled rank 3 codebook and rank 4 codebook have a nesting property; and wherein when the received codebook has a value of r=1 or 2, and $C_2$ is sub-sampled to 1 bit, $C_1$ is sub-sampled to 3 bits, wherein the sub-sampled $C_1$ is $C_1 = \{W_1^{(0)}, W_1^{(2)}, W_1^{(4)}, \ldots, W_1^{(14)}\}$ such that the sampled $C_2$ is $$C_2 = \left\{ \begin{bmatrix} e_1 \\ e_1 \end{bmatrix}, \begin{bmatrix} e_1 \\ je_1 \end{bmatrix} \right\} \text{ for } r = 1,$$

and the sampled $C_2$ is $$C_2 = \left\{ \begin{bmatrix} e_1 & e_1 \\ e_1 & -e_1 \end{bmatrix}, \begin{bmatrix} e_1 & e_1 \\ je_1 & -je_1 \end{bmatrix} \right\} \text{ for } r = 2.$$

2. The method of claim 1, wherein when the received codebook has a value of r=1 or 2, $C_1$ is sub-sampled to 4 bits, and $C_2$ is defined as:

the sub-sampled $C_2$ is $$C_2 = \left\{ \begin{bmatrix} e_1 \\ e_2 \end{bmatrix} \right\} \text{ for } r = 1,$$

and the sub-sampled $C_2$ is $$C_2 = \left\{ \begin{bmatrix} e_1 & e_1 \\ e_1 & -e_1 \end{bmatrix} \right\} \text{ for } r = 2,$$

wherein $e_1$ indicates a 4×1 selection vector for which the first element has a value of 1 and the other elements are zero, and the sub-sampled rank 1 codebook, rank 2 codebook and the corresponding rank 3 code-book and rank 4 codebook have a nesting property.

3. The method of claim 1, wherein, when the received codebook has a value of r=1, for a codeword $W_1^{(4k+l)}$ in $C_1$, k=0, 1, 2, 3, l=0, 1, 2, 3, a codeword $$\frac{1}{\sqrt{2}} \begin{bmatrix} e_1 \\ \alpha_l e_1 \end{bmatrix}$$

in $C_2$ is extracted to correspond thereto, wherein $e_1$ indicates a 4×1 selection vector for which the first element has a value of 1 and the other elements are zero, and $\alpha_0 = 1$, $\alpha_1 = j$, $\alpha_2 = -1$ and $\alpha_3 = -j$; and when the received codebook has a value of r=2, for a codeword $W_1^{(2k+l)}$ in $C_1$, k=0, 1, ..., 7, l=0, 1, a codeword $$\frac{1}{\sqrt{2}} \begin{bmatrix} e_1 & e_1 \\ \alpha_l e_1 & -\alpha_l e_1 \end{bmatrix}$$

in $C_2$ is extracted to correspond thereto, wherein $\alpha_0 = 1$, $\alpha_1 = j$.

4. An apparatus for sub-sampling of a codebook in a LTE-A system where a precoding matrix W is a product of two matrices $W_1$ and $W_2$, wherein $W = W_1 W_2$, codebooks for W, $W_1$ and $W_2$ are denoted as C, $C_1$ and $C_2$ respectively, and r indicates a rank, the apparatus comprising:

a processor configured to sub-sample the received codebook C, the received sub-sampled codebook C has a size of equal to or less than 4 bits; and a receiver configured to receive the sub-sampled codebook C for precoding in an LTE advanced base station and/or user equipment, wherein when r=1 or 2, $C_1$ has the size of 4 bits and for a given codeword in $C_1$, one codeword in $C_2$ corresponds thereto;

wherein r=3 or 4 $C_1$ has a size of 2 bits and the processor sub-samples $C_2$ as:

$$C_2 = \left\{ \frac{1}{\sqrt{2}} \begin{bmatrix} Y_1 & Y_2 \\ Y_1 & -Y_2 \end{bmatrix} \right\} \text{ for } r = 3 \quad (1)$$

$(Y_1, Y_2) \in \{(e_1, [e_1, e_5]), (e_2, [e_2, e_6]), (e_3, [e_3, e_7]), (e_4, [e_4, e_8])\};$ $$C_2 = \left\{ \frac{1}{\sqrt{2}} \begin{bmatrix} Y & Y \\ Y & -Y \end{bmatrix} \right\} \text{ for } r = 4 \quad (2)$$

$Y \in \{[e_1, e_5], [e_2, e_6], [e_3, e_7], [e_4, e_8]\};$ wherein $e_k$ indicates an 8×1 selection vector for which the k-th element has a value of 1 and the other elements are zero, and the sub-sampled rank 3 codebook and rank 4 codebook have a nesting property; and wherein when r=1 or 2, the processor is configured to sub-sample $C_1$ and $C_2$ respectively, and $C_2$ is sub-sampled to 1 bit, $C_1$ is sub-sampled respectively to 3 bits, wherein the processor sub-samples $C_1$ as $C_1 = \{W_1^{(0)}, W_1^{(2)}, W_1^{(4)}, \ldots, W_1^{(14)}\}$ such that the processor samples $C_2$ as $$C_2 = \left\{ \begin{bmatrix} e_1 \\ e_1 \end{bmatrix}, \begin{bmatrix} e_1 \\ je_1 \end{bmatrix} \right\} \text{ for } r = 1,$$

and the processor samples $C_2$ as $$C_2 = \left\{ \begin{bmatrix} e_1 & e_1 \\ e_1 & -e_1 \end{bmatrix}, \begin{bmatrix} e_1 & e_1 \\ je_1 & -je_1 \end{bmatrix} \right\} \text{ for } r = 2.$$

5. The apparatus of claim 4, wherein when r=1 or 2, $C_1$ is sub-sampled to 4 bits, and the processor is configured to define $C_2$ as:

$$C_2 = \left\{ \begin{bmatrix} e_1 \\ e_1 \end{bmatrix} \right\} \text{ for } r = 1,$$

and $$C_2 = \left\{ \begin{bmatrix} e_1 & e_1 \\ e_1 & -e_1 \end{bmatrix} \right\} \text{ for } r = 2,$$

wherein $e_1$ indicates a 4×1 selection vector for which the first element has a value of 1 and the other elements are zero, and the sub-sampled rank 1 codebook, rank 2 codebook and the corresponding rank 3 code book and rank 4 codebook have a nesting property.

6. The apparatus of claim 4, wherein
when r=1, for a codeword $W_1^{(4k+l)}$ in $C_1$, k=0, 1, 2, 3, l=0, 1, 2, 3,
the processor extracts a codeword $$\frac{1}{\sqrt{2}} \begin{bmatrix} e_1 \\ \alpha_l e_1 \end{bmatrix}$$

in $C_2$ to correspond thereto, wherein $e_1$ indicates a 4×1 selection vector for which the first element has a value of 1 and the other elements are zero, and $\alpha_0=1$, $\alpha_1=j$, $\alpha_2=-1$ and $\alpha_3=-j$; and
when r=2, for a codeword $W_2^{(2k+l)}$ in $C_1$, k=0, 1, ..., 7, l=0, 1, the processor extracts a codeword $$\frac{1}{\sqrt{2}} \begin{bmatrix} e_1 & e_1 \\ \alpha_l e_1 & -\alpha_l e_1 \end{bmatrix}$$

in $C_2$ to correspond thereto, wherein $\alpha_0=1$, $\alpha_1=j$.

* * * * *